United States Patent Office 2,997,487
Patented Aug. 22, 1961

2,997,487
NOVEL PROCESS FOR THE PREPARATION OF A 16,17-DEHYDRO SUBSTITUTED PREGNANE AND INTERMEDIATES THEREFOR
Gerard Nomine, Noisy-le-Sec, France, assignor to Les Laboratoires Français de Chimiotherapie, Paris, France, a corporation of France
No Drawing. Filed July 6, 1960, Ser. No. 41,038
Claims priority, application France Sept. 18, 1959
5 Claims. (Cl. 260—397.3)

The present invention relates to a novel process for the preparation of a 16,17-dehydro substituted pregnane, namely, $\Delta^{16}$-pregnene-3,11,20-trione, of the formula:

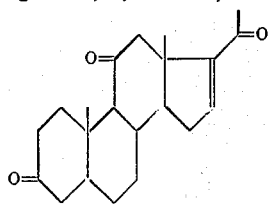

This product, described by Nes et al., J. Am. Chem. Soc., 1951, vol. 73, page 4765, is an important intermediate in the syntheses of steroids and serves especially as a starting material for the preparation of dexamethasone, as described in copending commonly-assigned U. S. Patent application Serial No. 2115, filed January 13, 1960.

Until now, an economical industrial process for the preparation of this $\Delta^{16}$-pregnene derivative has not been available. Nes et al. prepared it by chromic acid oxidation of 3α-hydroxy-$\Delta^{16}$-pregnene-11,20-dione, but the yields obtained in this stage were only on the order of 75% of the unpurified product.

It is an object of this invention to prepare 16,17-dehydro pregnanes by an economical process.

Another object of this invention is to produce $\Delta^{16}$-pregnene-3,11,20-trione by the novel sequence of steps of introducing the 3-oxo-group before the double bond in the 16,17-position is present.

A further object is the preparation of the novel intermediate products, 3α-hydroxy-17α-bromo-pregnane-11,20-dione and 17α-bromo-pregnane-3,11,20-trione.

These and other objects and advantages of the invention will be obvious from the following detailed description.

It has now been found that the oxidation of the alcohol in the 3-position before the introduction of the double bond in the 16,17-position produces practically quantitative yields and thus opens the way to a very economical and industrially easily operated process.

The process of this invention consists essentially of subjecting 3α-acetoxy-17α-bromo-pregnane-11,20-dione, I, to metathesis with a lower alkanol, and oxidizing the hydroxy group in the 3-position of the resulting 3α-hydroxy-17α-bromo-pregnane-11,20-dione, II, and then dehydro-brominating 17α-bromo-pregnane-3,11,20-trione, III, formed thereby. In order to better illustrate the invention, a flow diagram of the reaction is shown in Table I.

TABLE I

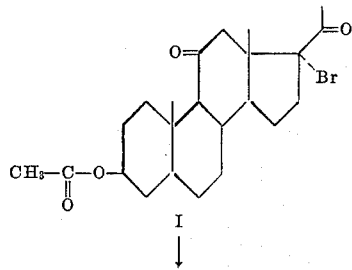

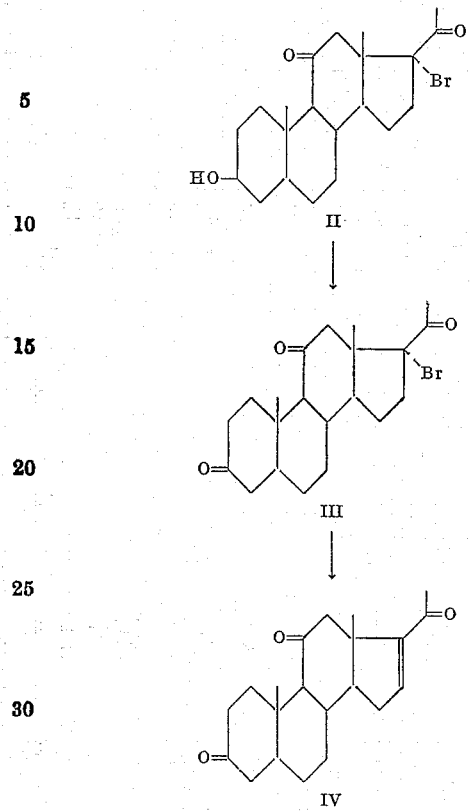

The 3α-acetoxy-17α-bromo-pregnane-11,20-dione, I, the strating material in the present process, is obtained, for example, according to U. S. Patent 2,684,963, by treatment of the acetate of 3α-hydroxy-pregnane—11,20-dione with N-bromosuccinimide. It is a common intermediate of the cortisone synthesis, which constitutes an additional advantage of the novel process. The metathesis with the lower alkanol is effected according to customary procedures and may be performed in either acidic or alkaline conditions, preferably acidic conditions.

The oxidation of the alcohol in the 3-position of 3α-hydroxy - 17α - bromo-pregnane - 11,20 - dione, II, may be achieved by customary procedures, for example, with N-bromosuccinimide.

As to the final dehydrobromination, it is advantageously carried out with the aid of a mixture of lithium bromide and lithium carbonate according to the process of U. S. Patent No. 2,923,721.

In the following example there is described a preferred embodiment to illustrate the invention. However, it should be understood that the invention is not intended to be limited to the specific embodiment. The melting points are instantaneous melting points determined on the Kofler block.

EXAMPLE 1

Preparation of $\Delta^{16}$-pregnene-3,11,20-trione, IV.

(a) 3α-hydroxy - 17α-bromo-pregnane-11,20-dione, II: 50 gm. of 3α-acetoxy-17α-bromo-pregnane-11,20-dione were introduced into 500 cc. of methanol. The mixture was heated at reflux until completely dissolved and 5 cc. of hydrobromic acid were added thereto. About 1 cc. of 35° Bé. sodium bisulfite was added, the solution was agitated for 18 hours at 20° C. and was poured into 2 liters of water. The mixture was vacuum filtered, washed with water, and dried in vacuo and 48 gm. of 3α-hydroxy-17α-bromo pregnane-11,20-dione, melting point=163° C., specific rotation $[\alpha]_D^{20} = -33.8° \pm 2$ (c=1%, chloroform) were obtained.

The product, which is novel, was obtained in the form of small white crystals, insoluble in water, slightly soluble in ether, soluble in alcohol and hot ethyl acetate.

[Analysis: $C_{21}H_{31}O_3Br$; molecular weight=411.37]

|  | C, Percent | H, Percent | Br, Percent | O, Percent |
|---|---|---|---|---|
| Calculated | 61.308 | 7.596 | 19.427 | 11.668 |
| Found | 61.2 | 7.4 | 19.6 | 11.8 |

(b) 17α-bromo-pregnane-3,11,20-trione, III: 40 gm. of 3α-hydroxy-17α-bromo-pregnane-11,20-dione were introduced into 400 cc. of tertiary butanol containing 20% water. The mixture was heated until dissolution and then 38 gm. of N-bromosuccinimide were added at 40° C. At the end of several minutes, a deep red solution was formed. The solution was agitated for 20 minutes while maintaining the temperature by cooling at 40° C., then the bromine was driven off by the addition of 20 cc. of 35° Bé. sodium bisulfite in 20 cc. of water. Thereafter, the mixture was poured into water and vacuum filtered. The precipitate was washed with water and dried over phosphoric acid anhydride. 39.5 gm. of 17α-bromo-pregnane-3,11,20-trione, III, melting point=176° C., were obtained, which was directly usable for the rest of the synthesis.

For analysis, it was recrystallized in ethanol and a product melting at 178° C., specific rotation $[\alpha]_D^{20}=24.1°$ (c=1%, chloroform), was obtained, which is slightly soluble in alcohol, insoluble in water.

[Analysis: $C_{21}H_{29}O_3Br$; molecular weight=409.36]

|  | C, Percent | H, Percent | Br, Percent |
|---|---|---|---|
| Calculated | 61.61 | 7.14 | 19.52 |
| Found | 61.7 | 6.9 | 19.4 |

This product is not described in the literature.

(c) $\Delta^{16}$-pregnene-3,11,20-trione, IV: 40 gm. of 17α-bromo-pregnene-3,11,20-trione, III, were introduced into 200 cc. of dimethylformamide. 8 gm. of dry lithium bromide and 14 gm. of dry lithium carbonate were added and the mixture is heated under an atmosphere of nitrogen and agitated at 95 to 100° C. for 35 minutes. After cooling, the mixture was poured into 2 liters of water and neutralized with acetic acid. The precipitate, which consisted of $\Delta^{16}$-pregnene-3,11,20-trione, IV, was vacuum filtered. It was washed with water and dried over phosphoric acid anhydride. Yield: 31.6 gm. of compound IV, melting point=224° C., specific rotation $[\alpha]_D^{20}=+104.5°$ (c=1%, chloroform), which was identical to the product obtained by another process.

Various modifications of the process of the present invention may be made without departing from the spirit or scope thereof, and it is to be understood that the invention be limited only as defined in the appended claims.

I claim:
1. A process for the production of $\Delta^{16}$-pregnene-3,11,20-trione which comprises hydrolyzing 3α-acetoxy-17α-bromo-pregnane-11,20-dione with a lower alkanol to form 3α-hydroxy-17α-bromo-pregnane-11,20-dione, oxidizing the latter with N-bromosuccinimide to form 17α-bromo-pregnane-3,11,20-trione and dehydrobrominating the said trione with a mixture of lithium bromide and lithium carbonate and recovering said trione.
2. The process of claim 1 in which the hydrolysis is carried out in the presence of hydrobromic acid.
3. The process of claim 1 in which the hydrolysis is carried out at room temperature.
4. A process for the production of $\Delta^{16}$-pregnene-3,11,20-trione which comprises hydrolyzing 3α-acetoxy-17α-bromo-pregnane-11,20-dione with a lower alkanol in the presence of hydrobromic acid at room temperature to form 3α-hydroxy-17α-bromo-pregnane-11,20-dione, oxidizing the latter with N-bromosuccinimide to form 17α-bromo-pregnane-3,11,20-trione and dehydrobrominating the said trione with a mixture of lithium bromide and lithium carbonate to form $\Delta^{16}$-pregnene-3,11,20-trione.
5. 17α-bromo-pregnane-3,11,20-trione.

References Cited in the file of this patent

UNITED STATES PATENTS

| 2,684,963 | Schock et al. | July 27, 1954 |
| 2,915,535 | Warnant | Dec. 1, 1959 |
| 2,957,890 | Joly et al. | Oct. 25, 1960 |

OTHER REFERENCES

Anderson et al.: J.A.C.S. 76, 743–746 (1954).

UNITED STATES PATENT OFFICE
CERTIFICATION OF CORRECTION

Patent No. 2,997,487

August 22, 1961

Gerard Nomine

It is hereby certified that error appears in the above numbered patent requiring correction and that the said Letters Patent should read as corrected below.

Column 1, lines 61 to 70, formula I should appear as shown below instead of as in the patent:

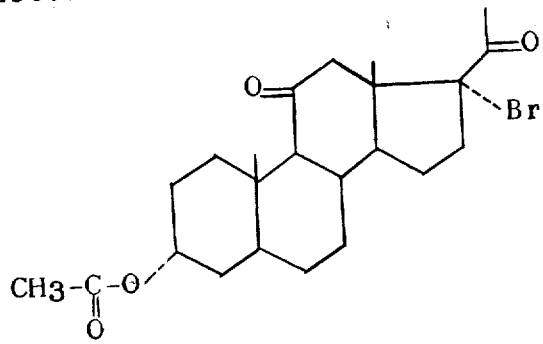

column 2, lines 1 to 10, formula II should appear as shown below instead of as in the patent:

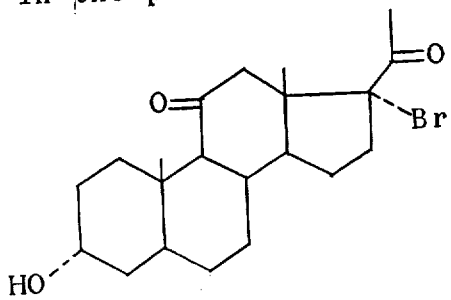

column 3, line 31, for "24.1°" read -- -24.1° --.

Signed and sealed this 20th day of March 1962.

(SEAL)
Attest:

ERNEST W. SWIDER
Attesting Officer

DAVID L. LADD
Commissioner of Patents